United States Patent
Ferguson et al.

(10) Patent No.: US 7,581,173 B1
(45) Date of Patent: Aug. 25, 2009

(54) METHODS AND APPARATUSES FOR FORMATTING WEB PAGES

(75) Inventors: David Ross Ferguson, El Dorado Hills, CA (US); John Joseph Jerger, Oakland, CA (US)

(73) Assignee: Google, Inc., Mountain View, CA (US)

( * ) Notice: Subject to any disclaimer, the term of this patent is extended or adjusted under 35 U.S.C. 154(b) by 16 days.

(21) Appl. No.: 10/949,098

(22) Filed: Sep. 24, 2004

Related U.S. Application Data

(60) Provisional application No. 60/506,651, filed on Sep. 25, 2003.

(51) Int. Cl.
G06F 17/00 (2006.01)

(52) U.S. Cl. .................. 715/235; 715/236; 715/248; 715/249

(58) Field of Classification Search ............... 715/513, 715/517, 522, 523, 235, 236, 248, 249
See application file for complete search history.

(56) References Cited

U.S. PATENT DOCUMENTS

| | | | |
|---|---|---|---|
| 5,845,299 A | 12/1998 | Arora et al. | |
| 5,860,073 A | 1/1999 | Ferrel et al. | |
| 5,911,145 A | 6/1999 | Arora et al. | |
| 6,029,182 A * | 2/2000 | Nehab et al. | 715/523 |
| 6,064,982 A | 5/2000 | Puri | |
| 6,112,192 A * | 8/2000 | Capek | 705/59 |
| 6,313,835 B1 * | 11/2001 | Gever et al. | 715/846 |
| 6,589,291 B1 | 7/2003 | Boag et al. | |
| 7,322,007 B2 * | 1/2008 | Schowtka et al. | 715/243 |
| 2001/0054050 A1 * | 12/2001 | Weil et al. | 707/517 |
| 2004/0148402 A1 * | 7/2004 | Sato | 709/227 |
| 2006/0010374 A1 * | 1/2006 | Corrington et al. | 715/517 |

OTHER PUBLICATIONS

"Colorful and Textured Backgrounds" Copyright 2002 http://www.mcli.dist.maricopa.edu/tut/tut16.html.*
Meyer, Eric, "Pure CSS Menus", Archived Jun. 24, 2002 http://meyerweb.com/eric/css/edge/menus/demo.html.*
Lie, Hakon Wium and Bert Bos, "Cascading Style Sheets," 2d. (Harlow, England: Addison Wesley, 1999).
"Web Style Sheets Home Page," W3C: http://www.w3.org/Style/ (7 pgs.) printed on Mar. 24, 2005.
Microsoft Office FrontPage "Product Overview": http://www.microsoft.com/office/frontpage/prodinfo/overview.mspx (4 pgs.) printed on Mar. 24, 2005.
HomeStead SiteBuilder LPX "How it Works": http://www.homestead.com/~site/simple/howitworks.html (1 pg.) printed on Mar. 24, 2005.

(Continued)

Primary Examiner—Adam M Queler
(74) Attorney, Agent, or Firm—Blakely, Sokoloff, Taylor & Zafman LLP

(57) ABSTRACT

Methods and apparatuses for formatting web pages through categorizing properties and values for specifying the appearance of web pages. In one aspect, a method includes: grouping styles into a set of scheme groups, one or more of the styles being capable of specifying an aspect of appearance of an element of a web page; defining a plurality of combinations of styles to create a plurality of schemes respectively for the scheme groups; assigning one scheme from one of the scheme groups to a first web page; and generating a second web page to contain content of the first web page and styles of the schemes assigned to the first web page.

29 Claims, 13 Drawing Sheets

OTHER PUBLICATIONS

"Yahoo! SiteBuilder 2.0 Manual": http://us.i1.yimg.com/us.yimg.com/i/us/wh/sb/yahoo_sitebuilder_manual.pdf (353 pgs.), 2004.

Macromedia Dreamweaver "At a Glance": http://www.macromedia.com/software/dreamweaver/productinfo/overview/ (2 pgs.) printed on Mar. 24, 2005.

Adobe GoLive! "Product overview": http://www.adobe.com/products/golive/overview.html (3 pgs.) printed on Mar. 24, 2005.

Fog Creek CityDesk "In Depth": http://www.fogcreek.com/CityDesk/fog0000000068.html (7 pgs.) printed on Mar. 24, 2005.

* cited by examiner

METHODS AND APPARATUSES FOR FORMATTING WEB PAGES

This application claims the benefit of the filing date of U.S. Provisional Application Ser. No. 60/506,651, filed Sep. 25, 2003, and entitled "Method for Formatting Web Pages Using Categorized Style Sheets and Properties" by the inventor David Ross Ferguson, which is incorporated here by reference.

FIELD OF THE TECHNOLOGY

At least some embodiments of the present invention relate to the creation and formatting of web pages that will be stored on a server that is connected to the network (e.g., Internet) and will be accessed by client computers that are also connected to the network (e.g., Internet) and are capable of viewing web pages.

BACKGROUND

The World Wide Web (also referred to as the web) has become a commonly used tool for people looking to locate information about a business or organization. As a result, businesses and organizations have been developing web sites that can be located and viewed by web users. These web sites typically are used as marketing tools to explain the benefits of an organization's services and/or products. Web sites that are professional in appearance, well-designed and easy to navigate can be very effective marketing tools.

There are web page design and development software applications that provide the capabilities necessary to create a web page in the HyperText Markup Language (HTML) format that can be uploaded to Internet-connected web servers and be presented to Internet-connected client computers that are able to display web pages. Some examples of these products include Microsoft FrontPage, Macromedia Dreamweaver, Adobe Go live! and NetObjects Fusion.

These software tools for web page design and development make it possible for a user to create web pages without having to understand some of the underlying HTML technologies.

However, presently known web design tools typically require that either all of the appearance settings be manipulated independently or provide an ad hoc approach that groups some settings while requiring others be managed individually. In either case, presently known web design tools typically require that their users have some familiarity with web page technologies in order to create a quality web site.

The currently available software tools do not provide a way to easily configure the many settings that affect the appearance of a web page. As a result, web pages that are created by people who are not experienced web designers often have an unprofessional and inconsistent appearance. This result makes the web site less effective as a marketing tool for an organization.

Some applications provide a set of templates or pre-formatted web pages whose content can be replaced by the user. The resulting web pages are professional in quality, but they look the same for organizations that use the same template. Worse, they do not easily support changing appearance settings. As a result, any company that can afford to hire a professional web designer will hire one instead of having an unprofessional web site or one that looks like a competitor's web site.

For businesses that are trying to establish a professional and unique web site, but lack the staffing or resources to hire a professional web designer, the traditional solutions are not acceptable. They typically do not have the time to learn and understand the web technologies or the money to hire an outside consultant.

SUMMARY OF THE DESCRIPTION

In one aspect of the present invention, a method includes: grouping styles into a set of scheme groups, one or more of the styles being capable of specifying an aspect of appearance of an element of a web page; defining a plurality of combinations of styles to create a plurality of schemes respectively for one or more of the scheme groups; assigning one scheme from one or more of the scheme groups to a first web page; and generating a second web page to contain content of the first web page and styles of the schemes assigned to the first web page.

BRIEF DESCRIPTION OF THE DRAWINGS

The present invention is illustrated by way of example and not limitation in the figures of the accompanying drawings in which like references indicate similar elements.

DETAILED DESCRIPTION

Overview

One embodiment of the present invention includes a software application running on a computer that allows a person to create and edit web pages, and to send the web pages to a server so that they can be accessed by other computers that are connected to the Internet. This mechanism permits a user of the software application to be able to select a scheme from a set of schemes in a number of different categories.

In one embodiment, the categories control the related subsets of the available appearance settings. Selections made by the user result in the appearance of a web page being altered to reflect the settings described by the scheme.

One embodiment of the present invention includes a web site authoring and management tool that makes it possible to create powerful and professional web sites without having a deep understanding of web technology and without being skilled in the art of web page design. The application typically runs on a computer, which typically has a storage, a display, a keyboard, and an operating system with a graphical user interface. However, it is understood that other data processing systems, such as a network computer, can also be used.

Environment

Figure 1:
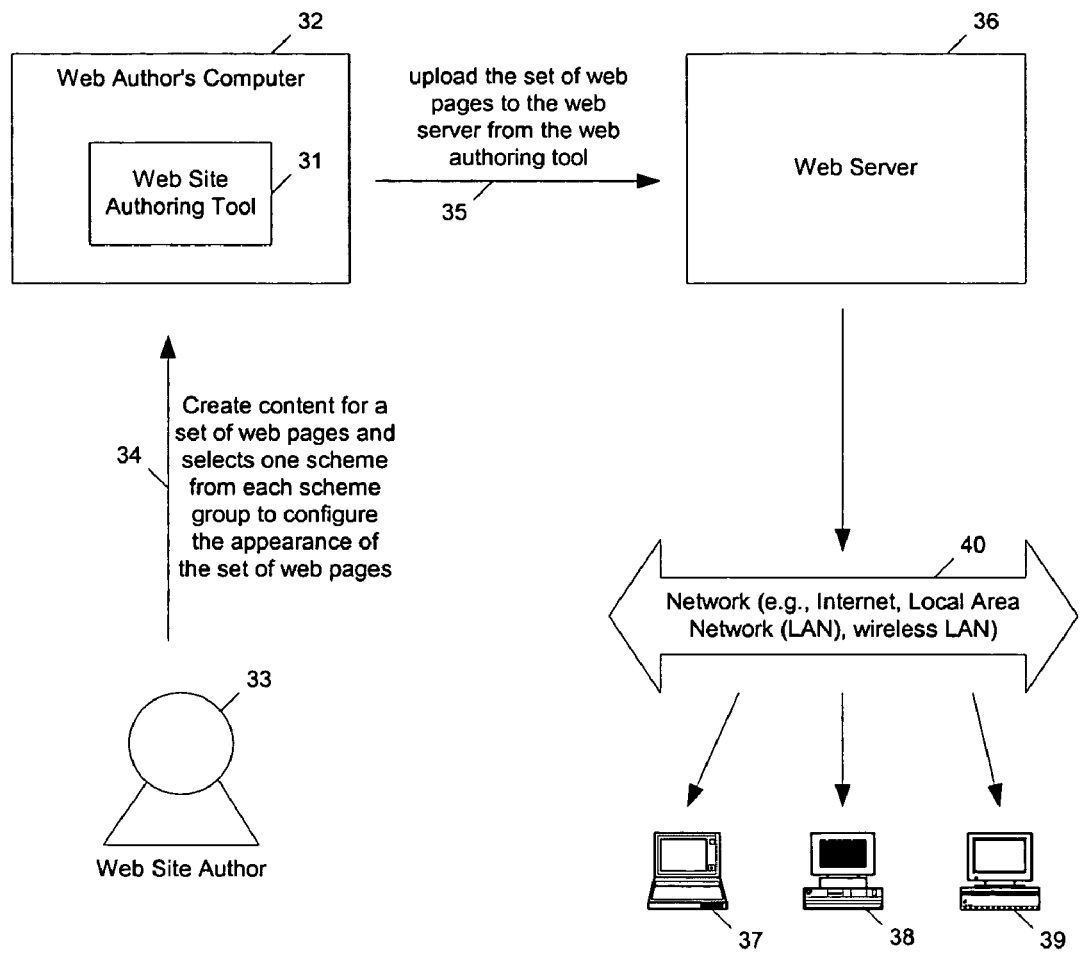
FIG. 1 illustrates an environment in which one embodiment of the present invention is used.

FIG. 1 shows an example of the application's environment according to one embodiment of the present invention. The Web site authoring tool (31) is a software application that runs on the web site author's computer (32). Contained within this software application is a pre-defined scheme group that consists of a set of schemes.

In one embodiment, a scheme group includes a set of related properties as defined by the creator of the scheme group. For example, a color scheme group may include properties such as background-color, color, border-color, etc. A scheme includes a set of styles belonging to the same scheme group.

The styles in the schemes have corresponding selectors. A cascading style sheets (CSS) selector is typically the HTML element/tag for which the appearance (e.g., color, font, etc.) can be specified using a cascading style sheet. For example, selector H1 can be used to specify the appearance of HTML element/tag <H1>.

Class selectors and ID selectors can also be used. A class selector is typically for an HTML element/tag of a particular class, such as H1.class for HTML element/tag <H1 Class=class>. An ID selector is typically for an HTML element/tag of a particular ID, such as H2#id for HTML element/tag <H2 ID=id>.

According to one embodiment of a cascading style sheets specification, while a class selector may apply to several elements on a page, an ID selector applies to one element, since the ID attribute is unique within the document. Further, in one embodiment, other custom selectors can also be used (e.g., for customized elements/tags).

In one embodiment, a style specifies the value for one or more specified properties for the selector. For example, the style "H1: color=blue, background-color=green, . . . " specifies that the HTML element/tag <H1> is to be rendered in a blue color, a green background-color, etc.

A property may be a single cascading style sheets property or externally-defined, such as color, background-color, border-color, etc. In one embodiment of the present invention, non-CSS properties (e.g., structure, texture) are also used for certain aspects of the appearances that are not specified in a CSS specification.

In one embodiment, a user interface provides a visual representation of the schemes grouped into the appropriate scheme group. The web site author (33) is able to create content for a set of web pages and select one scheme from one scheme group to configure the appearance of the set of web pages (34). The application then combines the styles with the created web page content (such as text, images, or any other item that can be contained within a web page) to customize the appearance of a web page.

The application applies the styles contained within the selected schemes to the chosen group of web pages, a single web page, or a portion of a web page (referred to in this document as a Block or subset). The resulting web pages can then be presented to the web site author for review.

If the style is not the desired style, the author can select a different scheme or a different set of schemes to create an entirely new appearance for the web page. When the web page or web pages are satisfactory to the author, the set of web pages can be uploaded (35) to the web server (36) from the web authoring tool. The web pages are published to the web site so that the users of the World Wide Web can view them.

For example, the users of computers (37, 38 and 39) connected to the network (40), such as Internet, local area network (LAN) and/or wireless LAN, etc., can access the web server (36) to view the web pages. Typically, the computers (37, 38 and 39) have a browser to present the web pages.

Process

Figure 2:
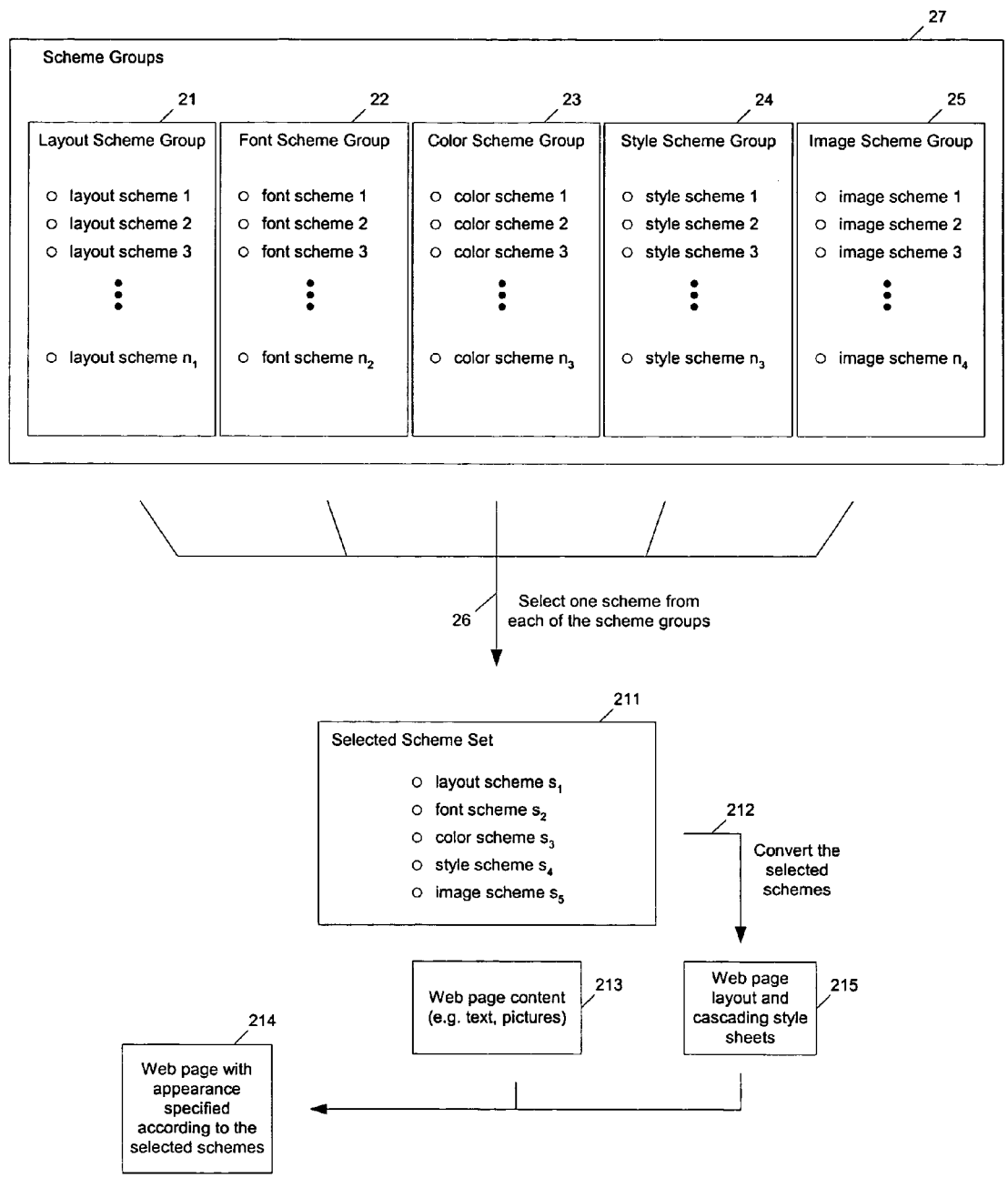
FIG. 2 illustrates a method to select and apply schemes to customize web site appearance according to one embodiment of the present invention.

FIG. 2 shows an example of how the schemes are grouped, selected and applied to web content to generate a web page according to one embodiment of the present invention. In FIG. 2, a scheme group (21-25) of available scheme groups (27) contains a number of schemes, which define the set of values that are contained in the scheme group.

In one implementation of the present invention, the scheme groups (27) are categorized into different schemes, such as layout scheme group (21), font scheme group (22), color scheme group (23), style scheme group (24), image scheme group (25). A style scheme group specifies various effects, such as texture, background-repeat, caption-side, clip, cursor, empty-cells line-height, orphans, outline-width, outline, overflow, quotes, alignment, white-space, windows, and various spacing, margin and style, etc.

Once the user has selected (26) schemes from the scheme groups, the selected schemes are combined into a scheme set (211). The selected schemes are then converted (212) into web page layout and cascading style sheets, which are combined with the web page content (213) (e.g., text and pictures) to produce a web page (214) with appearance specified according to the selected schemes.

Figure 3:
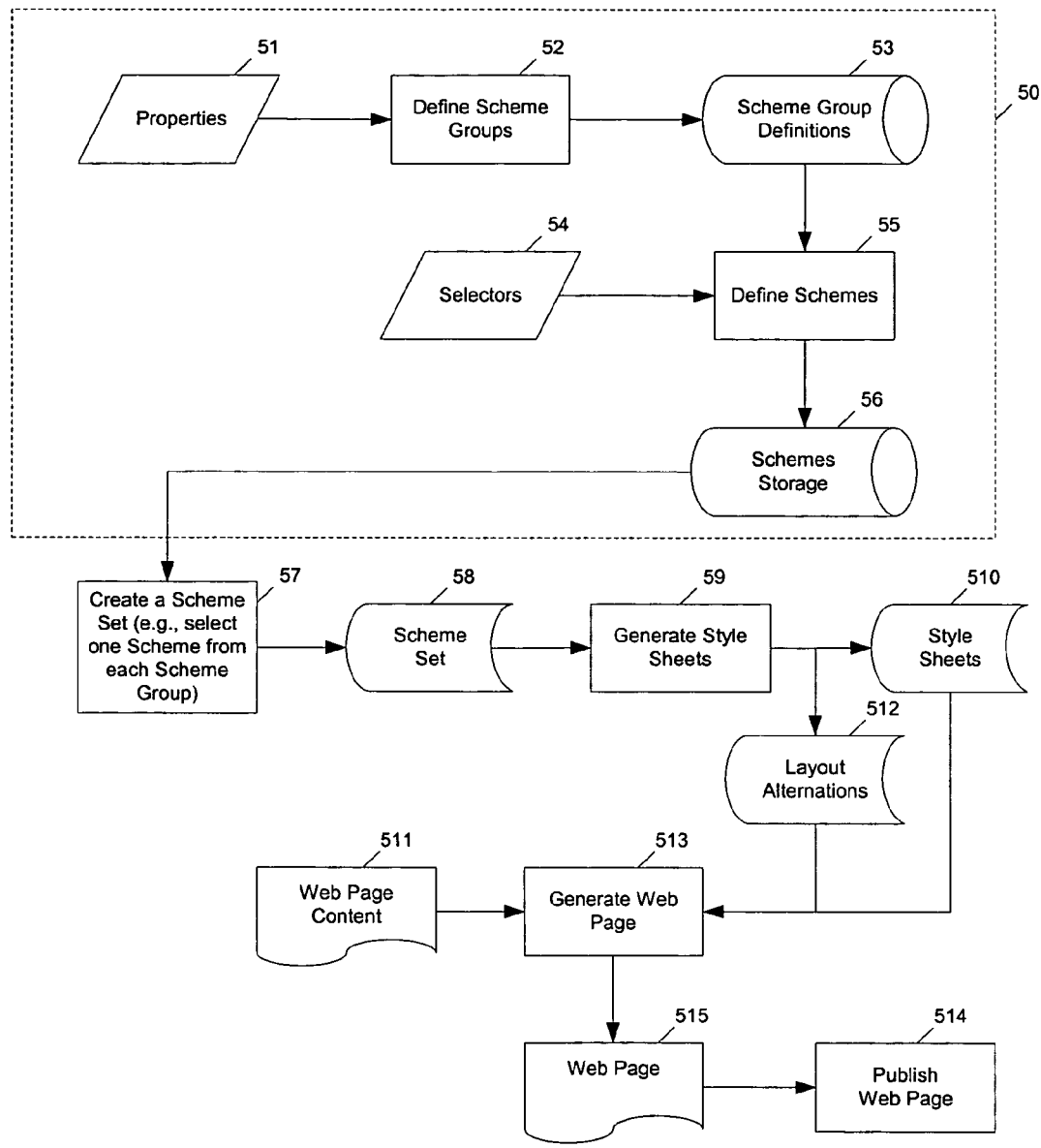
FIG. 3 shows a high-level flow of one embodiment of the present invention.

FIG. 3 shows a high-level flow of one embodiment of the present invention. Different properties (51) are categorized into different scheme groups (52) and generate scheme group definitions (53). The values of the properties of different scheme groups are designed for different selectors (54) to define schemes (55) for the scheme groups. The scheme definitions are stored in the scheme storage (56) for selection.

The scheme generation operations (50) is typically performed once and then used repeatedly on different web pages, until when further customization is needed (e.g., when it is desirable to create new schemes for selection). The schemes stored in scheme storage (56) can be selected (e.g., one from one scheme group) to create (57) a scheme set. The created scheme set (58) can be used to generate (59) style sheets. Some properties of selected schemes may require layout alternations (512). The style sheets (510) and the layout alternations, if any, are used to generate (513) a web page from the web page content (511). The generated web page (515) can then be published (514) on a web server. Details are provided below.

In one embodiment, to define a scheme group (52), two types of properties (51) may be provided: CSS properties and non-CSS properties.

CSS properties contain the set of properties that are specified in a W3C CSS Specification. They define a set of style properties that can be applied to a web page and its elements in order to determine what the appearance will be. For example, the property "font-size" describes what the size of the text will be when it is displayed on a web page.

In one embodiment of the present invention, non-CSS properties are also used in defining a page's appearance. For example, structure and texture can be used to specify the block layout structure and the textured background image for a web page element. For example, in one implementation, the property "structure" is used to specify the locations and relative sizes of the top, bottom, left, right, content panes within a document. In one implementation, the property "texture" is used to specify a grayscale image that will be combined with a background-color to produce a textured background image for a web page element.

In one embodiment, these non-CSS property names are defined in one implementation and can be extended to describe attributes that are not defined by the CSS specification. These examples are not meant to be inclusive. It can be extended to include new properties. For instance, the texture property can be used to change the appearance of the background of a web page. One implementation uses some non-CSS properties to order the blocks of content on a web page and to enhance the appearance of a web page. Additional non-CSS property types can also be used.

Figure 4:
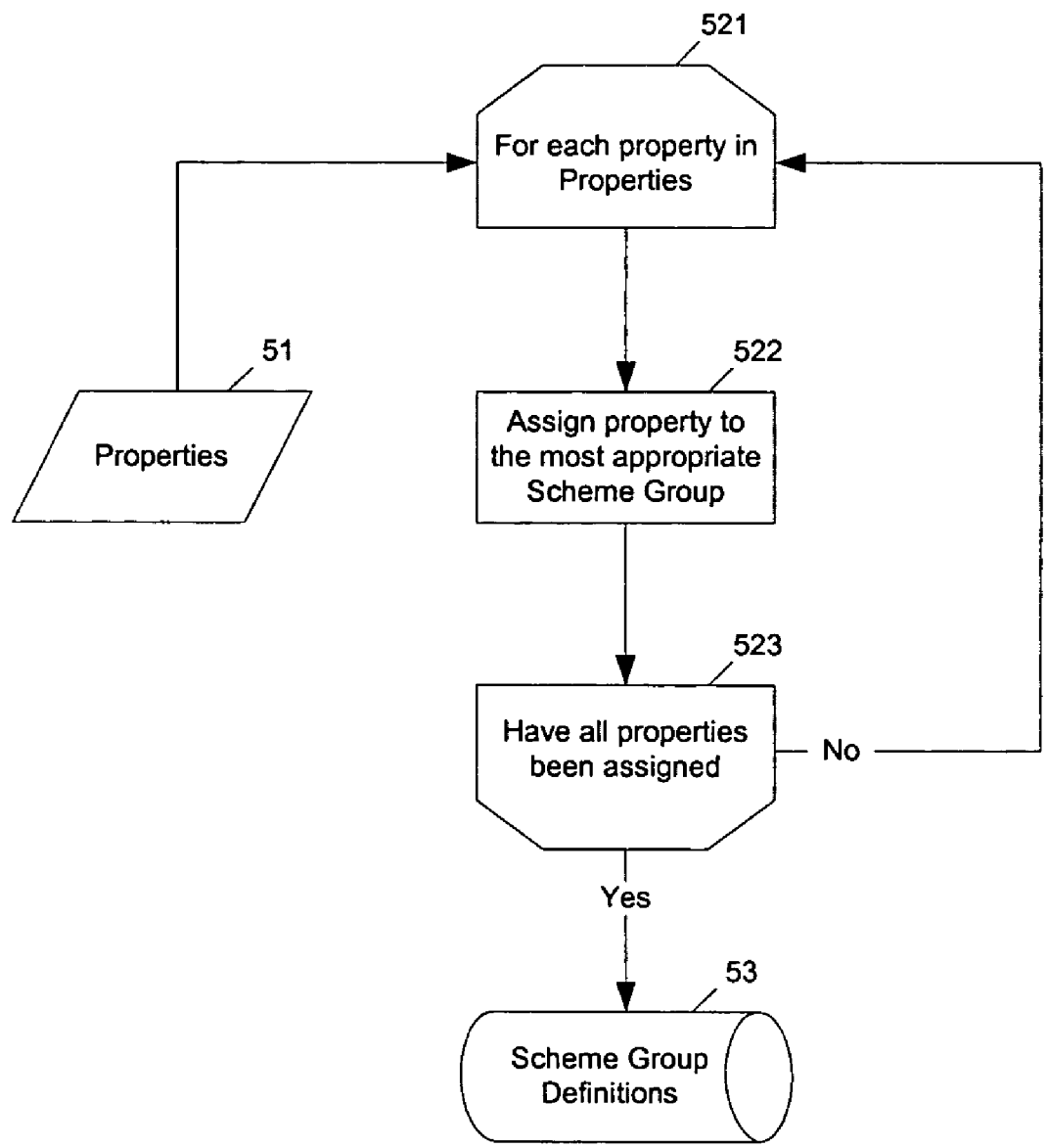
FIG. 4 shows a flow for defining a scheme group according to one embodiment of the present invention.

A scheme group (see, e.g., FIG. 4) can be defined by taking the property (51) contained in the set of properties and assigning it to one of the scheme groups (522).

For example, in one embodiment, background-attachment, background-image and background-position are assigned to the image scheme group;

In one embodiment, background-color, border-color, color, outline-color, border-top-color, border-right-color, border-bottom-color and border-left-color are assigned to the color scheme group.

In one embodiment, font-family, font-size, font-style, font-variant, font-weight, font, text-align, text-decoration, text-indent, and text-transform are assigned to the font scheme group.

In one embodiment, texture, background-repeat, letter-spacing, border-collapse, border-spacing, border-style, border-top-style, border-right-style, border-bottom-style, border-left-style, caption-side, clip, cursor, empty-cells line-height, list-style-image, list-style-position, list-style-type, list-style, margin, orphans, outline-style, outline-width, outline, overflow, quotes, vertical-align, white-space, windows, and word-spacing are assigned to the style scheme group.

In one embodiment, structure, bottom, clear, display, float, border-top-width, border-right-width, border-bottom-width, border-left-width, height, left, margin-right, margin-left, margin-top, margin-bottom, max-height, max-width, min-height, min-width, padding-top, padding-right, padding-bottom, padding-left, padding, page-break-after, page-break-before, page-break-inside, position, right, table-layout, top, width and z-index are assigned to the layout scheme group.

The above scheme groups are examples of scheme groups according to one embodiment of the present invention. Alternative embodiments can use different groups of properties for a different set of scheme groups.

In one embodiment, if a property will not be used in defining the appearance of a web page, it can be ignored and not used in other scheme group. For example, some CSS properties, such content, counter-increment, counter-reset, etc., do not specify the appearance of an HTML element; and these properties may be ignored and not assigned to other scheme groups.

When properties have been assigned to a scheme group (523), a scheme group is complete and is stored in the storage for the scheme group definitions (53). The next operation is to define the schemes that will belong to the scheme groups. A typical scheme of a particular type is made up of a set of styles. A style includes a selector that has a set of properties applied to them. A scheme typically represents a unique combination of styles. For example, font scheme 1 of the font scheme group may include:

Style 1: selector 1: property1=value1, property2=value2 . . . propertyn=valuen
Style 2: selector 2: property1=value3, property2=value4 . . . propertyn=valueo
. . .
Style n: selector n: property1=valuex, property2=valuey . . . propertyn=valuez Thus, style 1 of font scheme specifies that the values of property1, property2, . . . , propertyn are value1, value2, . . . , valuen respectively.

Typically, different selectors of a scheme may have different numbers of property/value pairs or the same number of property/value pairs. Different schemes of a scheme group typically include the same set of selectors. However, it is understood that different schemes of a scheme group can also use different numbers of selectors, since some of the schemes may not explicitly define the property/value pairs for some selectors.

For example, it may be desirable to leave some aspect of the appearances of some selectors to be determined by the default setting of a viewer's web browser in certain schemes.

Font Scheme 2 of the font scheme group may include:
Style 1: selector 1: property1=value2-1, property2=value2-2 . . . propertyn=value2-n
Style 2: selector 2: property1=value2-3, property2=value2-4 . . . propertyn=value2-o
. . .
Style n: selector n: property1=value2-x, property2=value2-y . . . propertyn=value2-z Font Scheme 3 of the font scheme group may include:
Style 1: selector 1: property1=value3-1, property2=value3-2 . . . propertyn=value3-n
Style 2: selector 2: property1=value3-3, property2=value3-4 . . . propertyn=value3-o
. . .
Style n: selector n: property1=value3-x, property2=value3-y . . . propertyn=value3-z Font Scheme m of the font scheme group may include:
Style 1: selector 1: property1=valuem-1, property2=valuem-2 . . . propertyn=valuem-n
Style 2: selector 2: property1=valuem-3, property2=valuem-4 . . . propertyn=valuem-o
Style n: selector n: property1=valuem-x, property2=valuem-y . . . propertyn=valuem-z A selector typically corresponds to a cascading style sheet (CSS) selector. A selector may refer to a category of web page elements (e.g., a class selector) or a specific web page element (e.g., an id selector). Selectors defined in the CSS Specification can be used.

As illustrated in the above examples, the style elements are combined to create a scheme. The schemes are made up of a set of styles. The styles include a selector and one or more property/value pairs. Typically, selectors are defined within the schemes. The set of properties may be the same for the styles, but the complete combination of property/value pairs for a scheme typically differs between schemes. However, the replicated schemes can be used.

An example an embodiment of a font scheme is:

H1: font-family="Swiss, Arial, sans-serif", font-size=14 pt, text-align=left

A: font-family="Swiss, Arial, sans-serif", font-size=8 pt, text-align=center

H2: font-family="Swiss, Arial, sans-serif", font-size=12 pt, text-align: left, font-weight=bolder

. . .

P: font-family="Axial Narrow", font-size=8 pt, text-align=left

Another example of a font scheme includes:

H1: font-family-serif, font-size=24 pt, text-align=left

A: font-family=sans-serif, font-size=10 pt, text-align=left, font-weight=lighter H2: font-family=serif, font-size=18 pt, text-align=center

. . .

P: font-family=sans-serif, font-size=10 pt, text-align=left, font-weight=lighter In the above examples, font schemes for a font scheme group have a set of styles associated with it. Both schemes describe styles for the same selectors (H1, A, H2, ... P). The style may share properties (e.g., H1 has a font-family property, A has a font-family property) and values (e.g. H1's text-alignment value is left and P's text-alignment value is left.) But the combined set of styles and their definitions are unique within the set of schemes.

Figure 5:
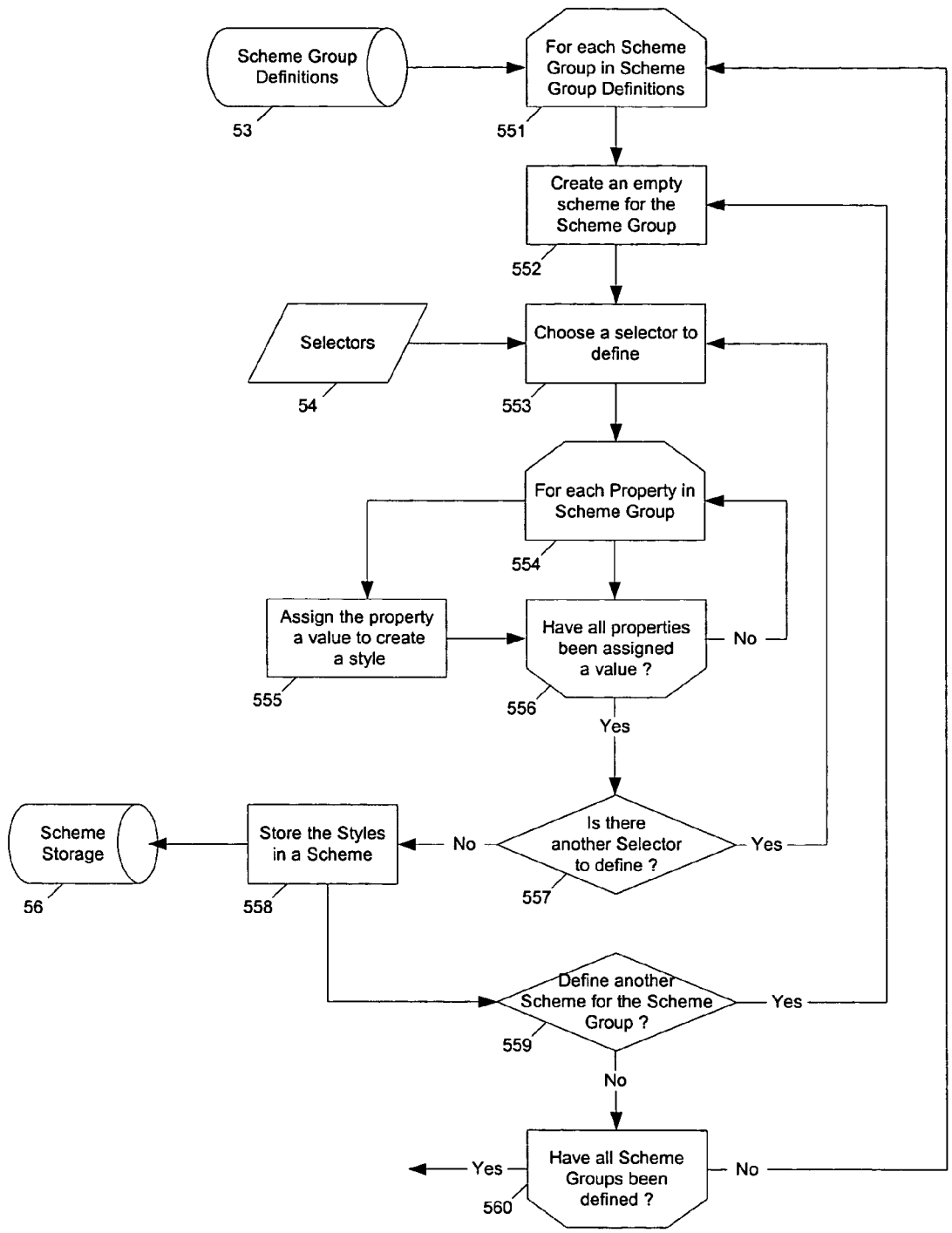
FIG. 5 shows a flow for defining a scheme according to one embodiment of the present invention.

FIG. 5 illustrates a method to define a scheme according to one embodiment of the present invention. A scheme is defined from two types of information: the scheme group definitions (53) and set of selectors (54). Selectors contain the set of elements whose appearance can be defined by the style properties. Selectors as defined in the W3C CSS Specification can be used. They are extensible in that new selectors can be created using the guidelines provided in the specification. One implementation of the present invention makes use of extended selectors in assigning schemes to elements within a web page.

In FIG. 5, schemes are defined by first selecting a scheme group that the scheme will belong to (551) and creating an empty scheme (552) that belongs to the selected scheme group. Next, a selector is chosen (553) from the set of available selectors (5.4). For a property (554) that was assigned to the scheme's associated scheme group, a value is assigned (555) to the property to create a style. The value that is assigned may be one of the values that is valid for a CSS property as defined in the W3C CSS level 2 Specification or values that are defined by the application. If this CSS specification changes, future embodiments could be extended to support the new properties and values without undue experimentation. The combination of selector, properties and their values is referred to as a style, which specifies the values for the properties of the selector. If it is not desirable to use a property in defining a style, a property can be excluded from the style definition.

The process of defining styles is repeated until selectors that will be used for the style have been assigned a set of properties and values (557). Once the styles have been defined, they are stored as a scheme (558), given a name and placed into scheme storage (56). If another scheme is to be defined for a scheme group (559), the process is repeated for the next combination of styles (552-559). After schemes for a scheme group have been defined (560), the process is repeated for the remaining scheme groups (551-560). The result is a set of schemes belonging to a scheme group and including a set of styles that defines how the elements on a web page will appear.

The defining or changing of schemes as illustrated in FIG. 5 can be done whenever there is a desire to change or extend the set of available schemes that can be used to format the web page. This can be done independently from applying the schemes to a web page. In one embodiment of the present invention, a user interface is provided for a web author to define or change the schemes (e.g., based on a set of pre-defined scheme groups). For example, a web author may modify an existing scheme to create a new, customized scheme.

Figure 6:
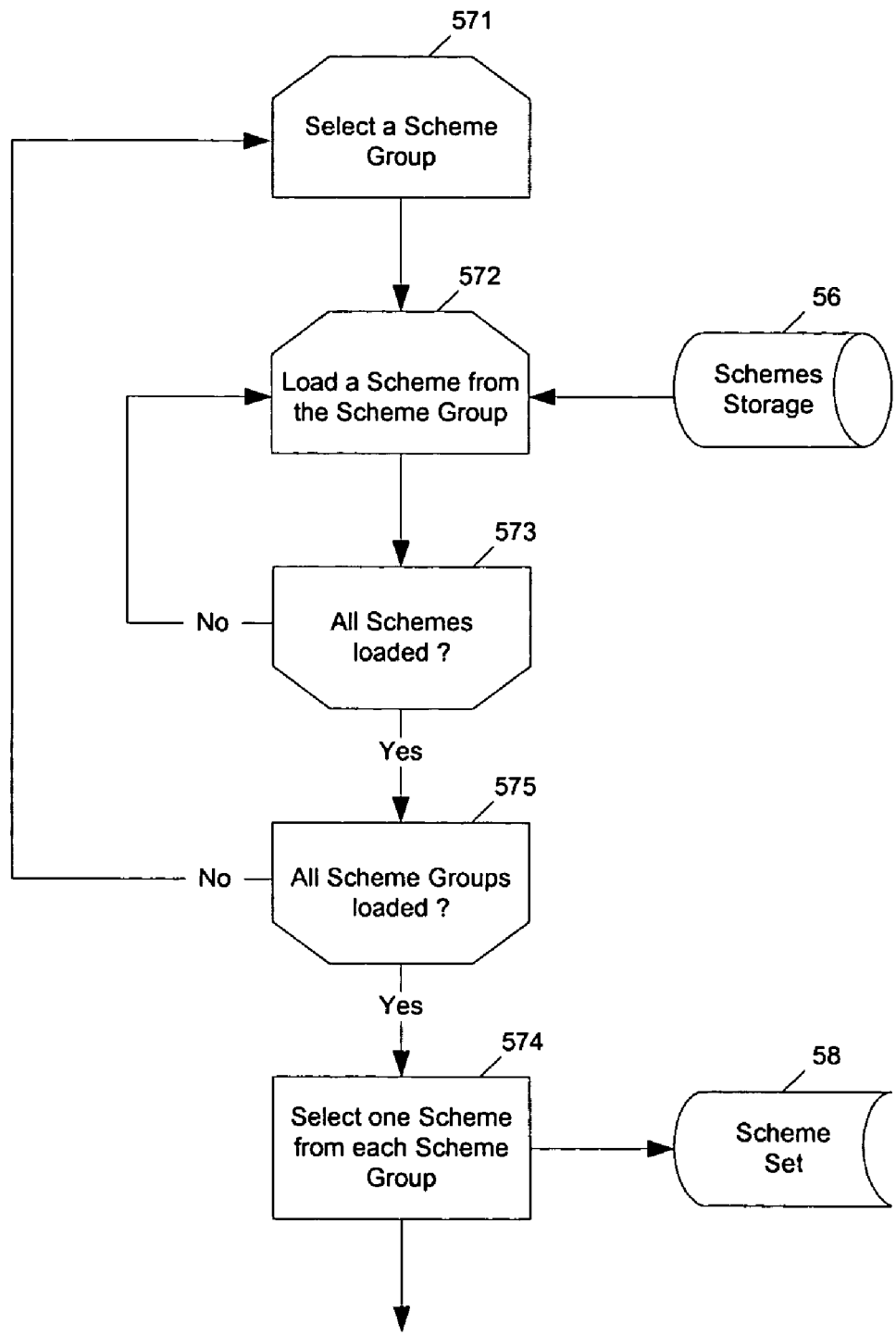
FIG. 6 shows a flow for creating a scheme set from a set of existing scheme groups according to one embodiment of the present invention.

Given a set of defined schemes, they can now be used to define how a web page will appear. As illustrated in FIG. 6, one embodiment of the present invention applies the schemes to the web page through selecting a scheme group (571), loading a scheme from the scheme group (572) until schemes of the scheme group have been loaded (573) and repeating for the scheme groups (574). The schemes of the scheme groups are presented to the web author for selection. One scheme from one scheme group is selected (574) and placed into a scheme set (58). One implementation of the present invention uses a software application to provide a visual representation of the scheme groups that contain a visual representation of the schemes within the scheme group. The user of the software application is then able to highlight one scheme within one scheme group. The highlighted scheme is then designated as the selected scheme and is stored in the scheme set.

EXAMPLE

Figure 9:
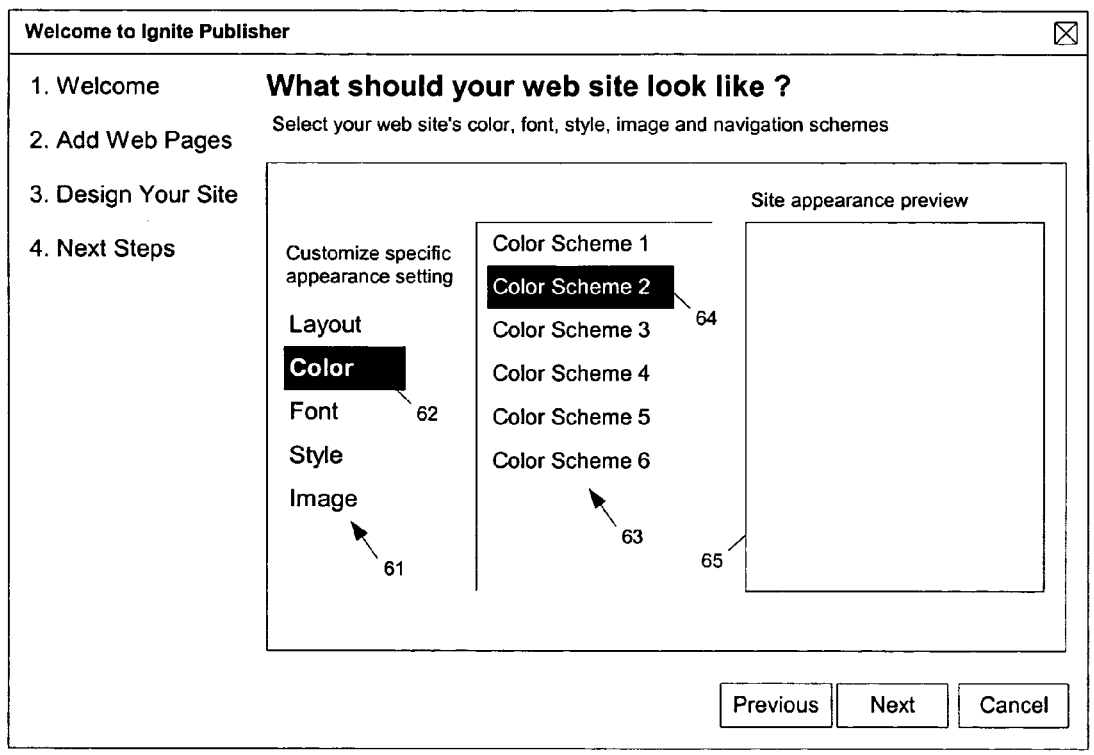
FIG. 9 illustrates an example of a scheme selection user interface according to one embodiment of the present invention.

FIG. 9 shows one example of these visual representations and the selection process according to one embodiment of the present invention. This example is from one implementation of the present invention that is a personal computer(PC)-based software application. This application provides the tools necessary to create and maintain a web site and provides access to this screen from its user interface.

In this example, the list of scheme groups (61) is on the left side. The user selects one of the scheme groups by using a mouse (or other cursor controlling devices, such as a touch pad, a track ball, or other controlling devices, such as a keyboard) to select the desired scheme group. The selected scheme group is highlighted (62); and the list of schemes (63) of the selected scheme group is then displayed. The user can then select the desired scheme by clicking on it using a mouse (or using other selection devices, such as keyboard, touch pad). When the scheme is selected, it is highlighted (64); and an example of the scheme appears in the preview pane (65). The user can repeat this process for the scheme groups. When the selection is completed (e.g., when the user selects the button labeled "next"), the screen is closed and the settings are then used on the web page or web pages.

Figure 10:
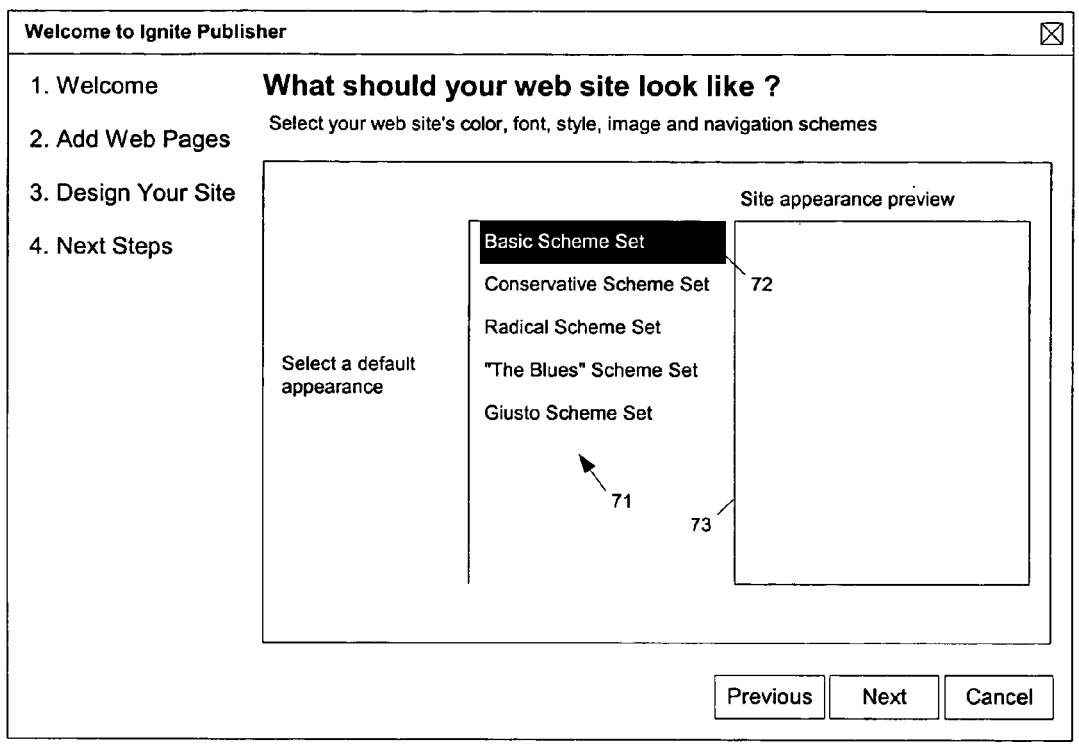
FIG. 10 illustrates an example of a scheme set selection user interface according to one embodiment of the present invention.

In another alternative embodiment, a pre-defined group of scheme sets is presented to the user who can select one scheme set. FIG. 10 shows one implementation according to one embodiment of the present invention. In FIG. 10, the user is presented with a list of pre-defined scheme sets (71), which include one scheme pre-selected from an available scheme group. If the user selects one scheme set using a mouse to click on the desired scheme set, the selected scheme set is highlighted (72); and an example that illustrates the properties of the scheme set is displayed in a preview pane (73). When the selection is completed, the user can provide input to close the screen and to apply the settings on the web page or web pages.

Figure 11:
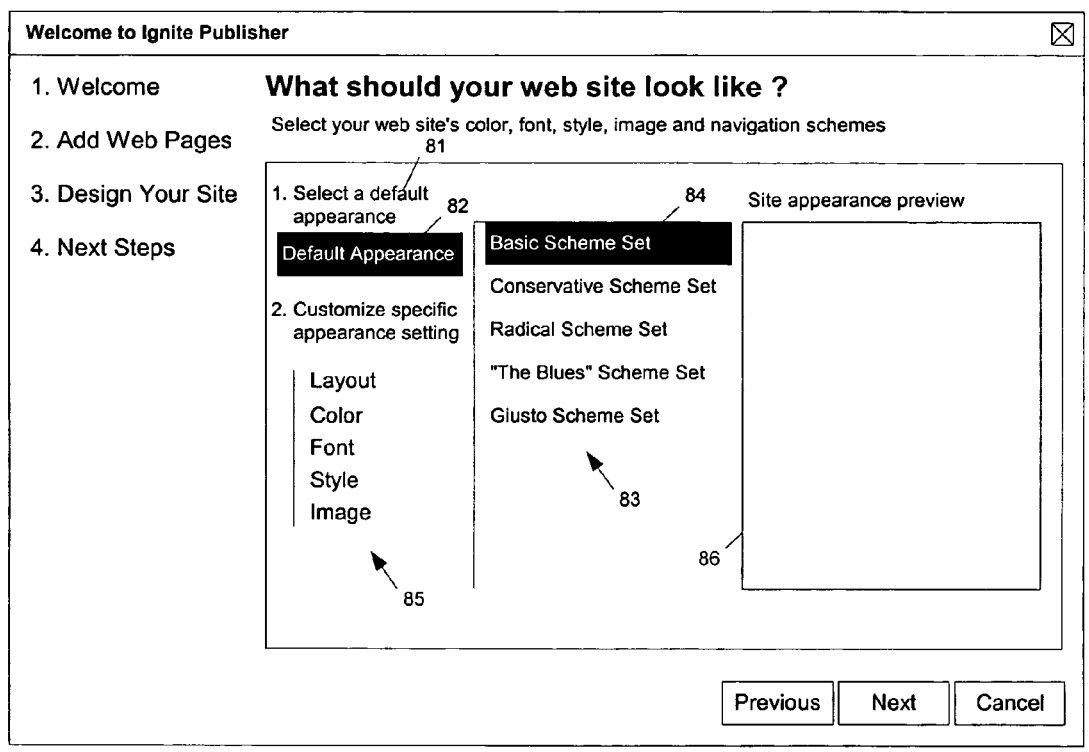
FIG. 11 illustrates an example of a combination of scheme set and scheme selection user interface according to one embodiment of the present invention.

Another embodiment allows a user to select one scheme set from a pre-defined group of scheme sets and then be able to change the selection of one or more schemes within the scheme set. FIG. 11 shows one implementation according to one embodiment of the present invention. In FIG. 11, the user is presented with a panel where a scheme set or scheme group can be selected (81).

The user first selects a base scheme set by selecting the scheme set item (82). The scheme list then displays the list of available scheme sets (83). The user can select one scheme set using a mouse to click on the desired scheme set. The selected scheme set is highlighted (84); and an example is displayed in the preview pane (86).

To modify the selected scheme set, the user can then select a scheme group from scheme groups (85). The selected scheme group is highlighted and the list of schemes in the selected scheme group is then displayed in a way similar to that illustrated in FIG. 9. The user can then select the desired scheme by clicking on it using a mouse. When the scheme is selected, it is highlighted (not shown in FIG. 11, but appearance would be similar to 83 in FIG. 11, or 63 in FIG. 9) and the selected scheme replaces the scheme that was defined in the scheme set for the selected scheme group.

The user may repeat this process for one scheme group or a few scheme groups. When the selection is completed, the user can provide input to close the screen and combine the default scheme set and the selected schemes as the scheme set that will be used for customize the appearance of a web page.

In an alternative embodiment schemes are selected programmatically. In one implementation, a program module is defined that has a function that makes it possible to obtain a list of available schemes for one scheme group and to define a scheme set that is comprised of one scheme from one scheme group. Some examples of the programming interfaces are provided below.

One programming interface can be used to return the array of available schemes of a given scheme group name, such as: Scheme [ ]GetAvailableSchemes(string SchemeGroupName).

One programming interface can be used to generate and return a scheme set for a given set of schemes, such as: SchemeSet SetSchemeSetUsingSchemes (Scheme[ ] selectedSchemes). The scheme set is also stored so that it can be applied to web pages or portions of web pages that are subsequently generated.

One programming interface can be used to return an array of available pre-defined scheme sets, such as: SchemeSet [ ] GetAvailableSchemeSets( ).

For a given defined scheme set, one programming interface can be used to store a scheme set so that it can be applied to web pages or portions of web pages that are subsequently generated, such as: void SetSchemeSet (SchemeSet selectedSchemeSet).

For a given predefined scheme set and a set of schemes, one programming interface can be used to generate and return a scheme set, which is stored so that it can be applied to web pages or portions of web pages that are subsequently generated. For example, one programming interface is: SchemeSet SetSchemeSetWithOverrideSchemes (SchemeSet selectedSchemeSet, Scheme[ ] selected Schemes).

Thus, function GetAvailableSchemes can be called to retrieve a list of available schemes; and function SetSchemeSetUsingSchemes can be called to set the scheme set. One embodiment of the present invention provides a programmatic way to obtain a list of available pre-defined scheme sets and to use a specific scheme set. For example, function GetAvailableSchemeSets can be called to retrieve a list of available scheme sets; and function SetSchemeSet can be called to set the scheme set.

One embodiment of the present invention provides a programmatic way to obtain a list of available schemes and scheme sets and to select a default scheme set and then override specific schemes in the default scheme set. To retrieve a list of available schemes, function GetAvailableSchemes is called. To retrieve a list of available scheme sets, function GetAvailableSchemeSets is called. A scheme set is then created by calling SetSchemeSetWithOverrideSchemes.

Figure 7:
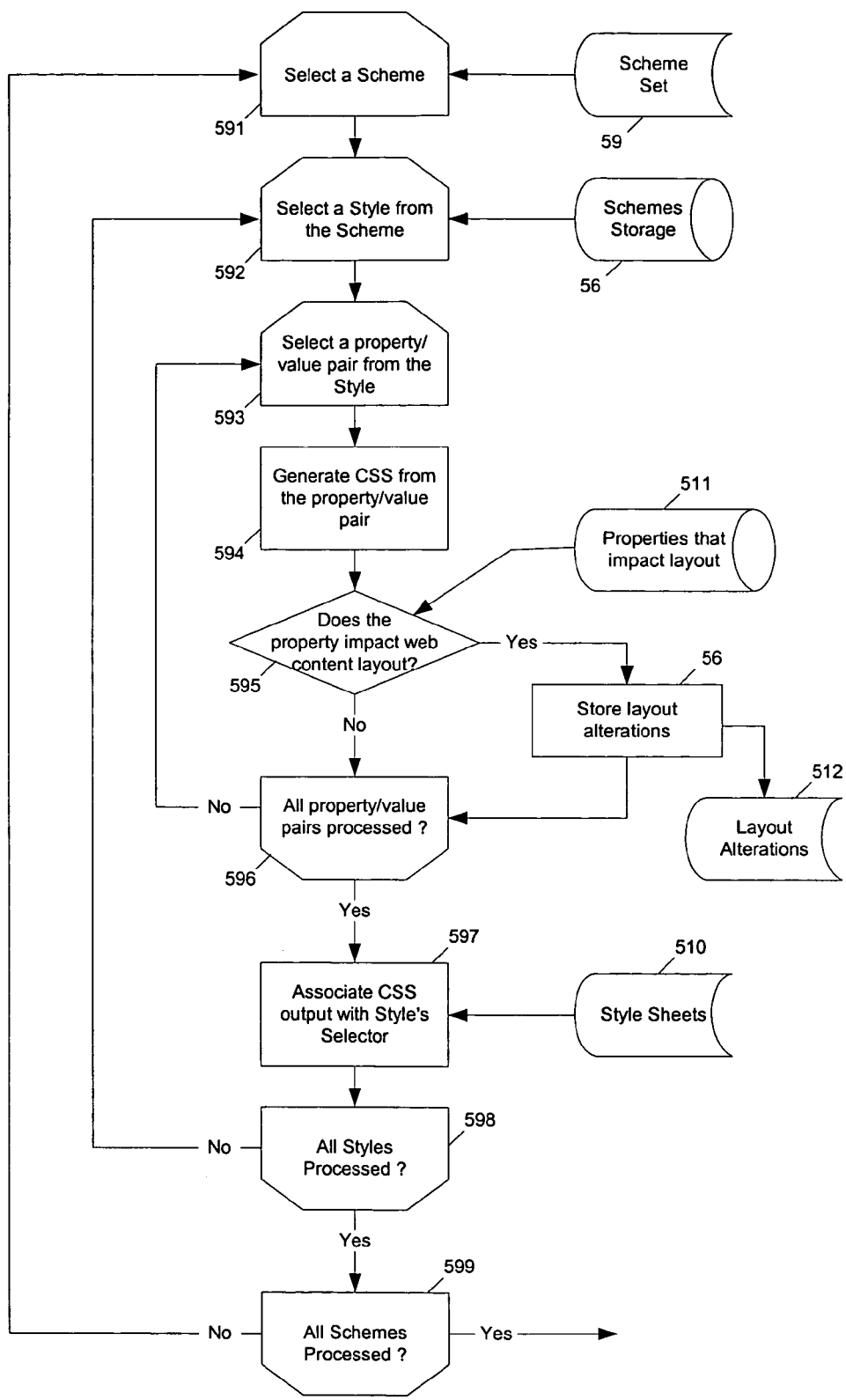
FIG. 7 shows a process of converting a scheme set into a set of styles according to one embodiment of the present invention.

Once a scheme set has been defined, they can be used to generate the style settings for a web page. In FIG. 7, the generation of the style settings for a web page is performed through selecting a scheme from the scheme set (591), selecting a style from the scheme (592) and selecting one property/value pair for the style (593). If the property is a CSS property, the property/value pair is converted into its CSS form (594). If the property/value pair is defined as a property that impacts layout (595) (e.g., the non-CSS property "structure"), the layout instructions for the property/value pair is stored as a layout alteration. The process is repeated until the property/value pairs have been converted (596).

Once a style's property/value pairs have been converted, they are associated with the style's selector (597) (in a valid CSS form) and stored in a style sheet (510) that can be directly placed into a web page (or through a link). An association includes the selector and the set of converted property/value pairs that are defined for the selector. For example, given a selector, H1, that has two font property/value pairs associated with it: font-style: italic, font-size: 12 pt, the resulting association would be: "H1 {font-style: italic; font-size: 12 pt}". The process is repeated for the styles within a scheme (598) and the schemes within the scheme set (599).

Layout alterations (512) make it possible to reorder the blocks that are contained within a web page. For example, if a web page consists of two blocks (e.g. DIV class=block1, DIV class=block2), a layout property could specify the order as "block1", "block2" or "block2", "block1". DIV in this context is an HTML-defined tag that denotes a block of data that is to be presented within a web page. This information can be applied to a web page to impact the order that the web pages objects will appear.

Figure 8:
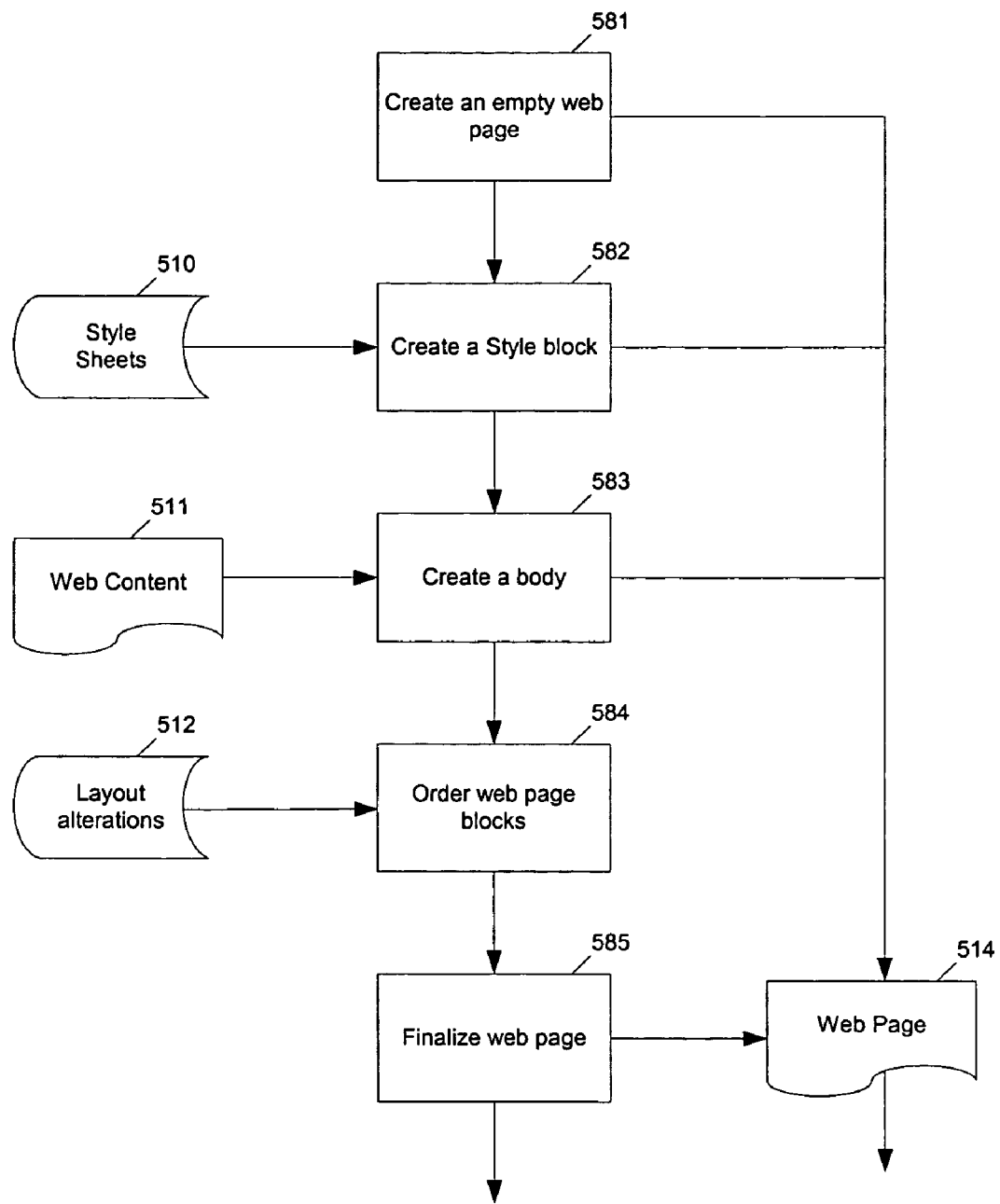
FIG. 8 shows a process of creating a web page using a scheme set according to one embodiment of the present invention.

When the style sheets and layout alterations have been defined, they can then be applied to a web page. In the example of FIG. 8, an empty web page is first created (581). Then, the style sheets (510) are converted into a style block (582). The style block can be created in two different ways, although alternate ways can be used without undue experimentation. The style sheets can be stored in a separate file and be referenced within a web page's style block (denoted by <STYLE> </STYLE> in an HTML document) using HTML IMPORT statements, or the style sheets can be directly included within the web page's style block. HTML supports several other methods to include styles, which can also be used. For example, style information can be included within an HTML tag (e.g. <H1 property=value . . . >) or the HTML LINK statement can be used.

Once the style block has been created, the body block is defined (denoted by <BODY> </BODY> in an HTML document to specify the beginning and end of the content) and the provided web content (511) is placed into the body block (583).

The method can also be applied other forms of web pages, particularly for the form web pages that supports the separation of appearance style and content.

If there are layout alterations (512) to be made, they are applied to the body block (denoted by <BODY></BODY> that marks the beginning and end of the web page content) by locating the specified blocks and reordering according to the definition that is provided in the layout alteration (512).

Figure 12:
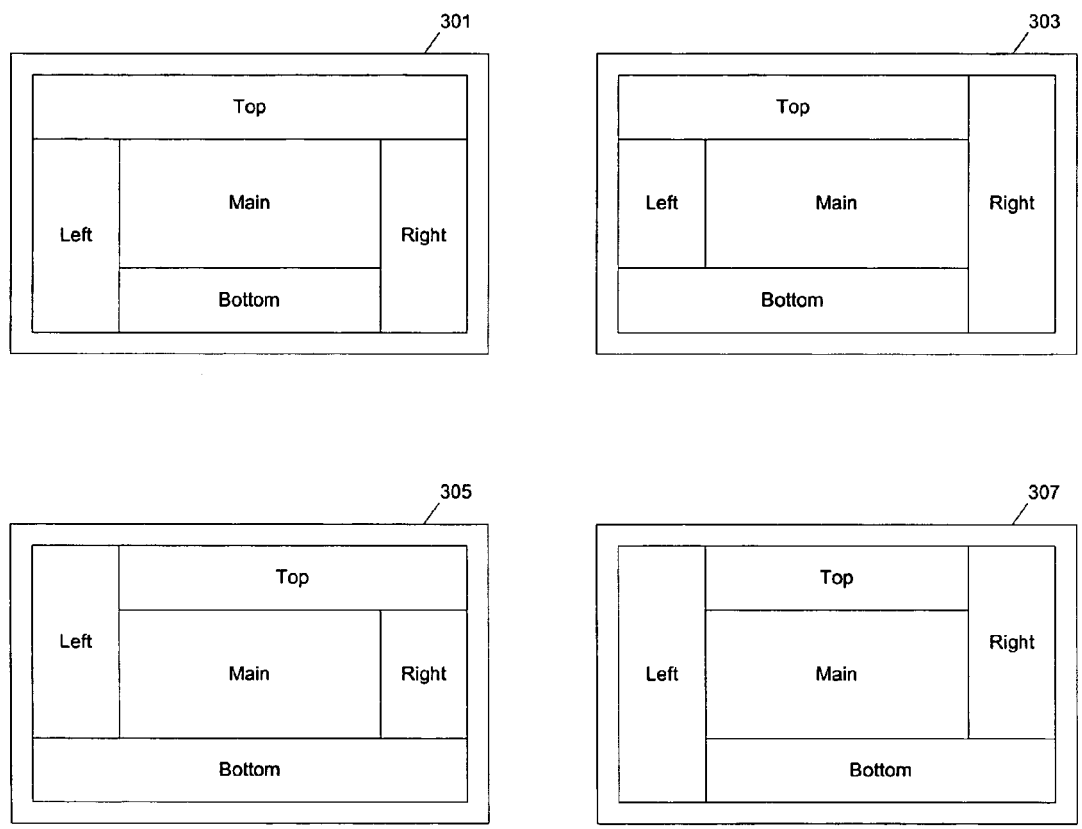
FIG. 12 illustrates layout structures which can be altered according to one embodiment of the present invention.

FIG. 12 illustrates an example of layout alterations for a web page according to one embodiment of the present invention. In one embodiment, one example of a property/value pair that has a layout impact is "Structure". Structure specifies the position of panes on a document. Different values for the property structure cause the software application to alter the order of the blocks in order to display the page in accordance with the prescribed property value.

For example, in the layout structure of wideshort (301), the panes of the web page are to be specified in the HTML document in the order of: Top, Left, Right, Main and Bottom.

In the layout structure of leftleft (303), the panes of the web page are to be specified in the HTML document in the order of: Right, Top, Left, Main and Bottom.

In the layout structure of rightwide (305), the panes of the web page are to be specified in the HTML document in the order of: Left, Top, Right, Main and Bottom.

In the layout structure of shortright (307), the panes of the web page are to be specified in the HTML document in the order of: Left, Right, Top, Main and Bottom.

Given a web page that is divided into a set of blocks (e.g., top, left, right, bottom and main) and a layout alteration that specified a different required order for the blocks, the blocks are rearranged into the desired order.

For example, a given web page may be in the following form.

```
<BODY>
<DIV CLASS=TOP>
{content of the top pane}
</DIV>
<DIV CLASS=LEFT>
{content of the left pane}
</DIV>
<DIV CLASS=RIGHT>
{content of the right pane}
</DIV>
<DIV CLASS=MAIN>
{content of the content pane}
</DIV>
<DIV CLASS=BOTTOM>
{content of the bottom pane}
</DIV>
</BODY>
```

When a layout alteration that requires the order to be: LEFT, RIGHT, TOP, CONTENT, BOTTOM, the blocks are located and rearranged to the proper order in the following form.

```
<BODY>
<DIV CLASS=LEFT>
{content of the left pane}
</DIV>
<DIV CLASS=RIGHT>
{content of the right pane}
</DIV>
<DIV CLASS=TOP>
{content of the top pane}
</DIV>
<DIV CLASS=CONTENT>
{content of the content pane}
</DIV>
<DIV CLASS=BOTTOM>
{content of the bottom pane}
</DIV>
</BODY>
```

In one embodiment, a final operation is to add any additional comment markup or document markup in finalizing the page (585). The resulting web page (514) is then ready to be published, stored to disk or be used in any way that a web page is typically used.

In one embodiment of the present invention, one or more of the non-CSS properties is used to specify the dynamic effects of elements of a web page. One example of non-CSS properties is the use of dynamic effects such as the behavior of menus on a Web page. For example, the menus of a navigation bar can be specified to have the dynamic effects of "drop-down" or "slide-right". Further, the menus can be specified as "drop-down", while sub-menus of the menus are specified as "slide-right." Thus, the menus and the sub-menus can have different dynamic effects. In general, how an element dynamically appears on a page can be specified. For example, an element may appear through a dynamic effect of "fading in" or "dissolving in".

In one embodiment of the present invention, the dynamic effects are implemented using JavaScript. For example, when a "fading in" or "drop-down" effect is specified for elements of a web page, a piece of JavaScript code is inserted into the web page so that when the web page is displayed in a web browser, the web browser runs the JavaScript code to show the dynamic effects as specified by the selected scheme. Alternatively, other scripting tools (e.g., Java) can also be used to implement the dynamic effects.

One embodiment of the present invention also supports applying schemes to blocks within a web page. This is done by assigning the blocks on the web page a unique selector identifier, generating multiple scheme sets that are converted into style sheets with selectors modified to include the unique selector identifier. Then, the style sheets are applied as described above. For example, after a default scheme set is selected for the entire web page, one of the schemes from the font scheme group can be selected for a left pane of a web page and another from the font scheme group for the right pane of the web page (e.g., to overwrite the default scheme set for the font scheme of the left and right panes).

One embodiment of the present invention also supports temporarily altering one or more styles for a specific web page or web page block. This would make it possible to fine tune the final appearance of a web page. According to cascading style sheets specification, the styles "cascade" into a new "virtual" style sheet in the increasing priority from browser default, external style sheet, internal style sheet (inside the <head> tag), to inline style (inside HTML element). An inline style (inside an HTML element) has the highest priority, which means that it will override every style declared inside the <head> tag, in an external style sheet, and in a browser (a default value). In one embodiment of the present invention, internal style and inline style specifications can be used to alter styles for a specific web page or web page block.

In one embodiment of the present invention, the user interfaces, such as those illustrated in the FIGS. 9-11, and various methods for categorizing of the styles, generation of schemes, scheme groups, scheme sets, selection of schemes for customizing web pages, etc., are implemented using data and instructions on a data processing system. In one implementation, the web authoring tool according to embodiments of the present invention is in the form of a software application program.

In one embodiment, a method for web page design and development includes: grouping the available styles into a set of scheme groups, defining different combinations of the styles in order to create a plurality of schemes, assigning one scheme from a scheme group to a web page and generating a web page that contains the specified styles.

In one embodiment, a method includes presenting the set of list of schemes available for a set of scheme groups in a web site publishing system. For example, a method for web page design and development includes: presenting the list of available schemes in scheme groups to a user of the system, providing a mechanism for the user to select one scheme from a scheme group, and generating a web page that contains the styles that are associated with the selected schemes.

In one embodiment, a method permits the application of a different set of schemes to a web page that has already had at least one set of schemes applied to it, resulting in a web page that reflects the styles defined in the most recently applied schemes. For example, a method for web page design and development includes: removing previously applied schemes from a web page, assigning one scheme from a scheme group to the web page and generating a web page that contains the most recently specified styles.

In one embodiment, a method includes presenting the list of schemes available for scheme groups in a web site publishing system that can be applied to a web page that already has a set of styles applied to it. For example, a method for web page design and development includes: presenting the list of available schemes in scheme groups to a user of the system, providing a mechanism for the user to select one scheme from a scheme group, removing the previously applied scheme sets and generating a web page that contains the styles that are associated with the selected schemes.

In one embodiment, a method includes applying one set of schemes to the web page, and a different set of schemes to a subset of the web page. For example, a method for web page design and development includes: assigning one scheme from a scheme group to the web page, assigning one scheme from one or more scheme groups to one or more subset of the web page and generating a web page that contains the styles such that the portion of the web page reflects the scheme styles that have been applied to it.

Hardware

Figure 13:
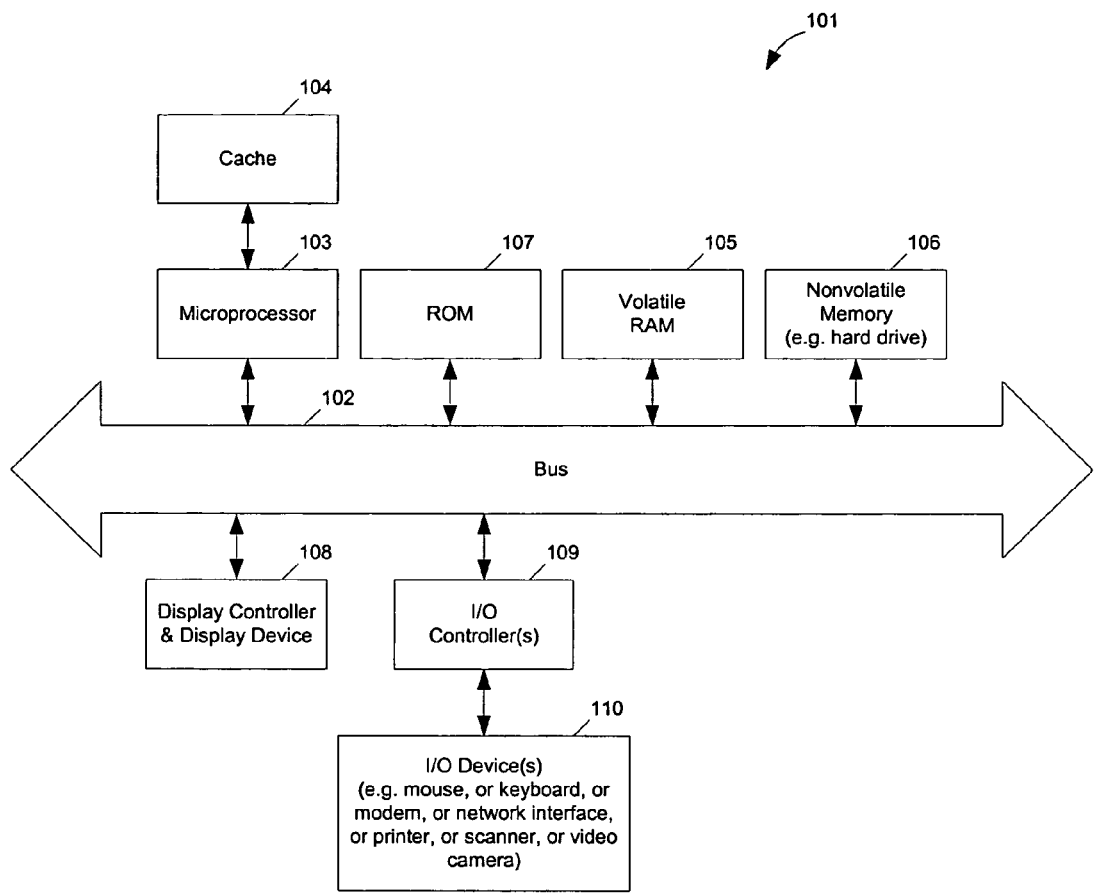
FIG. 13 illustrates a data processing system which can be used with embodiments of the present invention.

FIG. 13 illustrates a data processing system which can be used with embodiments of the present invention. Note that while FIG. 13 illustrates various components of a computer system, it is not intended to represent any particular architecture or manner of interconnecting the components as such details are not germane to the present invention. It will also be appreciated that network computers and other data processing systems which have fewer or more components may also be used with the present invention. The computer system of FIG. 13 may, for example, be a Sun workstation, or a personal computer (PC) running a Windows operating system, or an Apple Macintosh computer.

As shown in FIG. 13, the computer system 101, which is a form of a data processing system, includes a bus 102 and system core logic 112 which interconnect a microprocessor 103, a ROM 107, and volatile RAM 105 and a non-volatile memory 106.

The microprocessor 103, which may be, for example, a Pentium processor from Intel or a G4 or G5 microprocessor from Motorola, Inc. or IBM, is coupled to cache memory 104 as shown in the example of FIG. 13.

The bus 102 and system core logic 112 interconnect these various components together and also interconnects these components 103, 107, 105, and 106 to a display controller and display device 108 and to peripheral devices such as input/output (I/O) devices which may be mice, keyboards, modems, network interfaces, printers, scanners, video cameras and other devices which are well known in the art. Typically, the input/output devices 110 are coupled to the system through input/output controllers 109.

The volatile RAM 105 is typically implemented as dynamic RAM (DRAM) which requires power continually in order to refresh or maintain the data in the memory. The non-volatile memory 106 is typically a magnetic hard drive, a magnetic optical drive, or an optical drive (e.g., a DVD RAM), or other type of memory system which maintains data even after power is removed from the system. Typically, the non-volatile memory will also be a random access memory although this is not required.

While FIG. 13 shows that the non-volatile memory is a local device coupled directly to the rest of the components in the data processing system, it will be appreciated that the present invention may utilize a non-volatile memory which is remote from the system, such as a network storage device that is coupled to the data processing system through a network interface such as a modem or Ethernet interface.

The bus 102 may include one or more buses connected to one another through various bridges, controllers and/or adapters as is well known in the art. In one embodiment the I/O controller 109 includes a USB (Universal Serial Bus) adapter for controlling USB peripherals, and/or an IEEE-1394 bus adapter for controlling IEEE-1394 peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 107, volatile RAM 105, non-volatile memory 106, cache 104 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 103.

A machine readable medium can be used to store software and data which when executed by a data processing system causes the system to perform various methods of the present invention. This executable software and data may be stored in various places including for example ROM 107, volatile RAM 105, non-volatile memory 106 and/or cache 104 as shown in FIG. 13. Portions of this software and/or data may be stored in any one of these storage devices.

Thus, a machine readable medium includes any mechanism that provides (i.e., stores and/or transmits) information in a form accessible by a machine (e.g., a computer, network device, personal digital assistant, manufacturing tool, any device with a set of one or more processors, etc.). For example, a machine readable medium includes recordable/non-recordable media, such as read only memory (ROM), random access memory (RAM), magnetic disk storage media, optical storage media, flash memory devices, etc.

General

The description and drawings are illustrative of the invention and are not to be construed as limiting the invention. Numerous specific details are described to provide a thorough understanding of the present invention. However, in certain instances, well known or conventional details are not described in order to avoid obscuring the description of the present invention. References to one or an embodiment in the present disclosure are not necessarily references to the same embodiment; and, such references mean at least one.

The present invention includes methods and apparatuses which perform these methods, including data processing systems which perform these methods, and computer readable media which when executed on data processing systems cause the systems to perform these methods.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method, comprising:
    defining a plurality of combinations of styles, each combination to create one of a plurality of schemes, each style including a selector, a property, and a value for the property, the values for the properties providing an appearance of an element of a web page, the selectors indicating which element is to be affected by the corresponding property value;
    grouping schemes for related elements and properties into scheme groups;
    selecting one scheme from each of the scheme groups to generate a selected scheme set;
    generating style sheets based on the selected scheme set;
    assigning the style sheets to a first web page; and
    generating a second web page to contain content of the first web page and styles of the selected style sheets assigned to the first web page.

2. The method of claim 1, further comprising:
    presenting a list of schemes in a scheme group; and
    receiving user input to select one scheme from the schemes in the scheme group, the selected scheme to be assigned to the first web page responsive to the user input.

3. The method of claim 1, wherein said generating comprises:
    removing styles from the first web page; and
    applying the styles of the schemes assigned to the first web page to generate the second web page.

4. The method of claim 1, wherein at least a portion of the styles of the schemes is applied only to a subset of the first web page to generate second web page.

5. The method of claim 1, wherein the scheme groups further comprise:
    a group to provide layout;
    a group to provide font;
    a group to provide color; and
    a group to provide image.

6. The method of claim 1, wherein said generating comprises:
    altering a structure of the first web page.

7. The method of claim 1, wherein an attribute described by an at least one style of the scheme groups is one of:
    structure and texture.

8. The method of claim 1, wherein said assigning is in response to calls to a programming interface to select schemes from scheme groups.

9. The method of claim 1, further comprising:
    publishing the second web page on a web site.

10. The method of claim 1, wherein said generating comprises:
    generating one or more cascading style sheets for the second web page from the selected schemes.

11. The method of claim 1 wherein a first one of the scheme groups contains styles to provide layout structure and texture.

12. A method, comprising:
    presenting a plurality of scheme groups, each scheme including a plurality of styles, each style including a selector, a property, and a value for the property, the values for the properties providing an appearance of an element of a web page, the selectors indicating which element is to be affected by the corresponding property value, each scheme group including a plurality of schemes that have related elements and properties;
    receiving input to select a set of schemes one from each of one or more of the scheme groups for a first web page; and
    generating a second web page to contain content of the first web page and to use styles of the set of the selected set of schemes, wherein said generating comprises:
        removing one or more styles of the first web page; and
        applying the styles of the selected set of schemes assigned to the first web page to generate the second web page.

13. The method of claim 12, wherein one or more of the styles of the set of schemes defines an aspect of appearance of a HyperText Markup Language (HTML) element of a web page.

14. The method of claim 13, wherein one or more of the styles of the set of schemes defines one or more attributes of an HTML element in accordance with a cascading style sheets (CSS) specification.

15. The method of claim 12, wherein said generating comprises:
    altering a layout of the first web page.

16. A machine readable medium containing data and instructions which when executed by a data processing system cause the system to perform a method, comprising:
    receiving input to select a first scheme group from a plurality of scheme groups, the first scheme group comprising a plurality of schemes having related elements and properties, each scheme corresponding to a plurality of different combinations of styles, respectively, each style including a selector, a property, and a value for the property, the values for the properties providing an appearance of an element of a web page, the selectors indicating which element is to be affected by the corresponding property value;
    receiving input to select a first scheme from the plurality of schemes of the first scheme group for a first web page; and
    generating a second web page, the second web page including content of the first web page and using styles of the first scheme.

17. The medium of claim 16, wherein a style of the first scheme is to provide an aspect of appearance of a type of elements of a web page; and the style of the first scheme is applied only to the type of elements in a first selected subset of the second web page.

18. The medium of claim 16, wherein the method further comprises:
    receiving input to select a second scheme from the plurality of schemes of the first scheme group for a second selected subset of the first web page;
    wherein a style of the second scheme is to provide an aspect of appearance of the type of elements of a web page; and the style of the second scheme is applied only to the type of elements in the second selected subset of the second web page.

19. The medium of claim 16, wherein the styles of the first scheme are applied to the entire second web page.

20. The medium of claim 16, further comprising:

receiving input to select a second scheme group from the plurality of scheme groups, the second scheme group comprising a plurality of schemes corresponding to a plurality of different combinations of styles respectively; and receiving input to select a second scheme from the plurality of schemes of the second scheme group for the first web page;

wherein the second web page further uses styles of the second scheme.

21. The medium of claim 16, further comprising:

presenting the plurality of scheme groups on a user interface system for user selection; and presenting the plurality of schemes of the first scheme group on the user interface system for user selection.

22. A data processing system, comprising:

means for presenting a plurality of scheme groups, each scheme including a plurality of styles, each style including a selector, a property, and a value for the property, the values for the properties providing an appearance of an element of a web page, the selectors indicating which element is to be affected by the corresponding property value, each scheme group including a plurality of schemes that have related elements and properties;

means for receiving input to select a set of schemes one from each of one or more of the scheme groups for a first web page; and means for generating a second web page to contain content of the first web page and to use styles of the selected set of schemes.

23. The data processing system of claim 22, wherein said means for generating the second web page comprises means for removing one or more styles of the first web page.

24. The data processing system of claim 22, wherein said means for generating the second web page comprises means for applying a first one of the set of schemes for the entire second web page and applying a second one of the set of schemes for a subset of the second web page.

25. A method, comprising:

grouping schemes having related elements and properties into scheme groups;

defining a plurality of combinations of styles, each combination to create one of a plurality of the schemes, respectively, for one or more of the scheme groups, each style including a selector, a property, and a value for the property, the values for the properties providing an appearance of an element of a web page, the selectors indicating which element is to be affected by the corresponding property value;

presenting the plurality of schemes for the one or more of the scheme groups in a user interface for selection;

receiving user input to select at least one of the plurality of schemes for each of the one or more of the scheme groups for at least a portion of a first web page;

generating cascading style sheets based on at least a portion of the selected at least one of the plurality of schemes for the one or more of the scheme groups;

applying the cascading style sheets to at least the portion of the first web page to generate a second web page; and publishing the second web page to show content of the first web page with an appearance according to the selected one of the plurality of schemes for the one or more of the scheme groups.

26. The method of claim 25, wherein a first scheme of the selected at least one of the plurality of schemes for the one or more of the scheme groups is selected from a first scheme group for a first portion of the first web page; a second scheme of the selected at least one of the plurality of schemes for the one or more of the scheme groups is selected from the first scheme group for a second portion of the first web page; and the first and second portions of the first web page are different.

27. The method of claim 26, further comprising:

altering a layout structure of the first web page to generate the second web page.

28. The method of claim 25, wherein the method further comprises:

providing a computer code for the second web page to implement how an element dynamically appears on the second web page according to the first style.

29. The method of claim 28, wherein the computer code comprises ECMAScript.

* * * * *

UNITED STATES PATENT AND TRADEMARK OFFICE
CERTIFICATE OF CORRECTION

PATENT NO.       : 7,581,173 B1                                      Page 1 of 1
APPLICATION NO. : 10/949098
DATED            : August 25, 2009
INVENTOR(S)      : Ferguson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 117 days.

Signed and Sealed this

Fourteenth Day of September, 2010

David J. Kappos
*Director of the United States Patent and Trademark Office*